(12) United States Patent
Sugimoto et al.

(10) Patent No.: US 12,218,358 B2
(45) Date of Patent: Feb. 4, 2025

(54) ALL-SOLID-STATE SECONDARY BATTERY

(71) Applicant: Samsung SDI Co., Ltd., Yongin-si (KR)

(72) Inventors: Toshinori Sugimoto, Suwon-si (KR); Saebom Ryu, Suwon-si (KR); Junhwan Ku, Suwon-si (KR); Youngeal Kim, Suwon-si (KR)

(73) Assignee: SAMSUNG SDI CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/241,200

(22) Filed: Apr. 27, 2021

(65) Prior Publication Data

US 2021/0336269 A1 Oct. 28, 2021

(30) Foreign Application Priority Data

Apr. 28, 2020 (KR) .................. 10-2020-0051825

(51) Int. Cl.
*H01M 4/62* (2006.01)
*H01M 4/02* (2006.01)
(Continued)

(52) U.S. Cl.
CPC ............ *H01M 4/625* (2013.01); *H01M 4/04* (2013.01); *H01M 4/134* (2013.01); *H01M 10/0525* (2013.01); *H01M 2004/027* (2013.01)

(58) Field of Classification Search
CPC .......... H01M 4/625; H01M 4/62; H01M 4/04; H01M 4/134; H01M 4/131; H01M 4/133; H01M 4/366; H01M 4/38; H01M 4/382; H01M 4/386; H01M 4/405; H01M 4/667; H01M 4/364; H01M 4/587;
(Continued)

(56) References Cited

U.S. PATENT DOCUMENTS 9,979,047 B2 5/2018 Matsumura et al.
10,141,762 B2 11/2018 Shindo et al.
(Continued)

FOREIGN PATENT DOCUMENTS

CN 109167017 A 1/2019
JP 2014154237 A 8/2014
(Continued)

OTHER PUBLICATIONS

International Search Report PCT/KR2021/001147 dated May 4, 2021.
(Continued)

*Primary Examiner* — Matthew T Martin
*Assistant Examiner* — Adam J Francis
(74) *Attorney, Agent, or Firm* — CANTOR COLBURN LLP

(57) ABSTRACT

An all-solid-state secondary battery includes: a cathode layer including a cathode active material, an anode layer including an anode current collector and an anode active material layer disposed on the anode current collector, the anode active material layer including an anode active material and amorphous carbon, and a solid electrolyte layer disposed between the cathode active material layer and the anode active material layer, wherein a weight ratio of the anode active material to the amorphous carbon is 1:3 to 1:1, and the anode layer has sheet resistance of about 0.5 milliohms-centimeters or less.

15 Claims, 7 Drawing Sheets

(51) Int. Cl.
H01M 4/04 (2006.01)
H01M 4/134 (2010.01)
H01M 10/0525 (2010.01)

(58) Field of Classification Search
CPC .......... H01M 10/0525; H01M 10/052; H01M 10/0562; H01M 10/0565
See application file for complete search history.

(56) References Cited

U.S. PATENT DOCUMENTS

| | | | |
|---|---|---|---|
| 10,985,407 B2 | 4/2021 | Suzuki et al. | |
| 2008/0118834 A1* | 5/2008 | Yew | C01G 39/006 429/231.95 |
| 2013/0224585 A1* | 8/2013 | Oh | C01G 53/50 429/211 |
| 2014/0080000 A1* | 3/2014 | Han | H01M 10/0525 429/223 |
| 2014/0099551 A1* | 4/2014 | Han | H01M 4/587 429/223 |
| 2014/0154533 A1* | 6/2014 | Schaefer | H01M 10/4235 429/61 |
| 2014/0220436 A1 | 8/2014 | Yokoyama et al. | |
| 2014/0370337 A1 | 12/2014 | Matsui et al. | |
| 2016/0351962 A1* | 12/2016 | Li | C07D 497/04 |
| 2018/0351159 A1* | 12/2018 | Fujiki | H01M 4/382 |
| 2019/0157723 A1 | 5/2019 | Suzuki et al. | |
| 2019/0165357 A1* | 5/2019 | Senoue | H01M 4/1395 |
| 2020/0373609 A1 | 11/2020 | Yashiro et al. | |
| 2021/0036362 A1 | 2/2021 | Ueno et al. | |

FOREIGN PATENT DOCUMENTS

| | | |
|---|---|---|
| JP | 2015-002065 A | 1/2015 |
| JP | 5846307 B2 | 12/2015 |
| JP | 2016201310 A | 12/2016 |
| JP | 2017103065 A | 6/2017 |
| JP | 2017147205 A | 8/2017 |
| JP | 201996610 A | 6/2019 |
| JP | 2019197728 A | 11/2019 |
| KR | 1020130116038 A | 10/2013 |
| KR | 1020200134126 A | 12/2020 |
| WO | 2019189311 A1 | 10/2019 |

OTHER PUBLICATIONS

Lee et al., "High-energy long-cycling all-solid-state lithium metal batteries enabled by silver-carbon composite anodes", Nature Energy, vol. 5 Apr. 2020, 299-308.

Office Action issued Nov. 27, 2023 of JP Patent Application No. 2022-566219.

Extended European Search Report dated Oct. 2, 2024, issued in corresponding EP Patent Application No. 21796748.8, 10 pp.

Flygare Joshua D. et al: "Mathematical model of Four-Line Probe to Determine conductive properties of thin-film battery electrodes", Journal of The Electrochemical Society, 2015, 162 (10), A2136-A2144.

Yong-Gun Lee, et al., "High-energy long cycling all-solid-state lithium metal batteries enabled by silver-carbon composite anodes", Nature Energy, Apr. 2020, vol. 5, 299-308.

* cited by examiner

ALL-SOLID-STATE SECONDARY BATTERY

CROSS-REFERENCE TO RELATED APPLICATION

This application claims priority to and the benefit of Korean Patent Application No. 10-2020-0051825, filed on Apr. 28, 2020, in the Korean Intellectual Property Office, and all the benefits accruing therefrom under 35 U.S.C. § 119, the content of which is incorporated herein in its entirety by reference.

BACKGROUND

1. Field

Embodiments of the disclosure relate to an all-solid-state secondary battery.

2. Description of Related Art

Recently, all-solid-state secondary batteries using a solid electrolyte as an electrolyte have attracted attention. To increase the energy density of such an all-solid-state secondary battery, use of lithium as an anode active material has been proposed. For example, it is known that the specific capacity (i.e., the capacity per unit mass) of lithium is about 10 times greater than that of graphite, which has been used as an anode active material. Therefore, when lithium is used as an anode active material, an all-solid-state secondary battery may be manufactured to have a lighter weight or a smaller size with increased output power.

When lithium is used as the anode active material, lithium (metallic lithium) may be precipitated at an anode side during charge. As charging and discharging of the all-solid-state secondary battery are repeated, the lithium precipitated at the anode side may grow through gaps (interstitial spaces) of the solid electrolyte in a branching tree-like fashion. The lithium grown in the branching tree-like fashion may be referred to as a lithium dendrite, and the growth of the lithium dendrite may cause a short circuit in the secondary battery. The growth of the lithium dendrite may also cause capacity reduction of the secondary battery.

SUMMARY

According to an aspect of the present disclosure, provided is an all-solid-state secondary battery using lithium as an anode active material.

Additional aspects will be set forth in part in the description which follows and, in part, will be apparent from the description, or may be learned by practice of the presented embodiments of the disclosure.

The all-solid-state secondary battery according to an aspect includes: a cathode layer including a cathode active material; an anode layer including an anode current collector and an anode active material layer disposed on the anode current collector, the anode active material layer including an anode active material and amorphous carbon; and a solid electrolyte layer disposed between the cathode active material layer and the anode active material layer, wherein a weight ratio of the anode active material to the amorphous carbon is 1:3 to 1:1, and the anode layer has sheet resistance of about 0.5 milliohms-centimeters or less.

The anode active material may be contained in an amount of about 1 weight percent (wt %) to 50 wt %, based on a total weight of the anode active material layer.

The anode active material may include at least one of gold (Au), platinum (Pt), palladium (Pd), silicon (Si), silver (Ag), aluminum (Al), bismuth (Bi), tin (Sn), titanium (Ti), or zinc (Zn).

The amorphous carbon may include at least one of carbon black (CB), acetylene black (AB), furnace black (FB), ketjen black (KB), or graphene.

The anode active material layer may further include a binder.

The binder may be contained in an amount of about 0.3 wt % to about 15 wt %, based on a total weight of the anode active material.

The anode active material layer may have a thickness in a range of about 1 micrometer (μm) to about 20 μm.

The all-solid-state secondary battery may further include a metal layer disposed between the anode current collector and the anode active material layer, wherein the metal layer includes at least one of lithium and a lithium alloy.

The metal layer may be disposed between the anode current collector and the anode active material layer before the all-solid-state secondary battery is charged.

The metal layer may have a thickness in a range of about 1 μm to about 200 μm.

The all-solid-state secondary battery may include a thin film including an element alloyable with lithium on the anode current collector, wherein the thin film is disposed between the anode current collector and the anode active material layer.

The thin film may have a thickness in a range of about 1 nm to about 500 nm.

The anode current collector, the anode active material layer and a region therebetween may be a lithium (Li) free regions at an initial state of or after discharging of the all-solid-state secondary battery.

The all-solid-state secondary battery may be a lithium battery.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
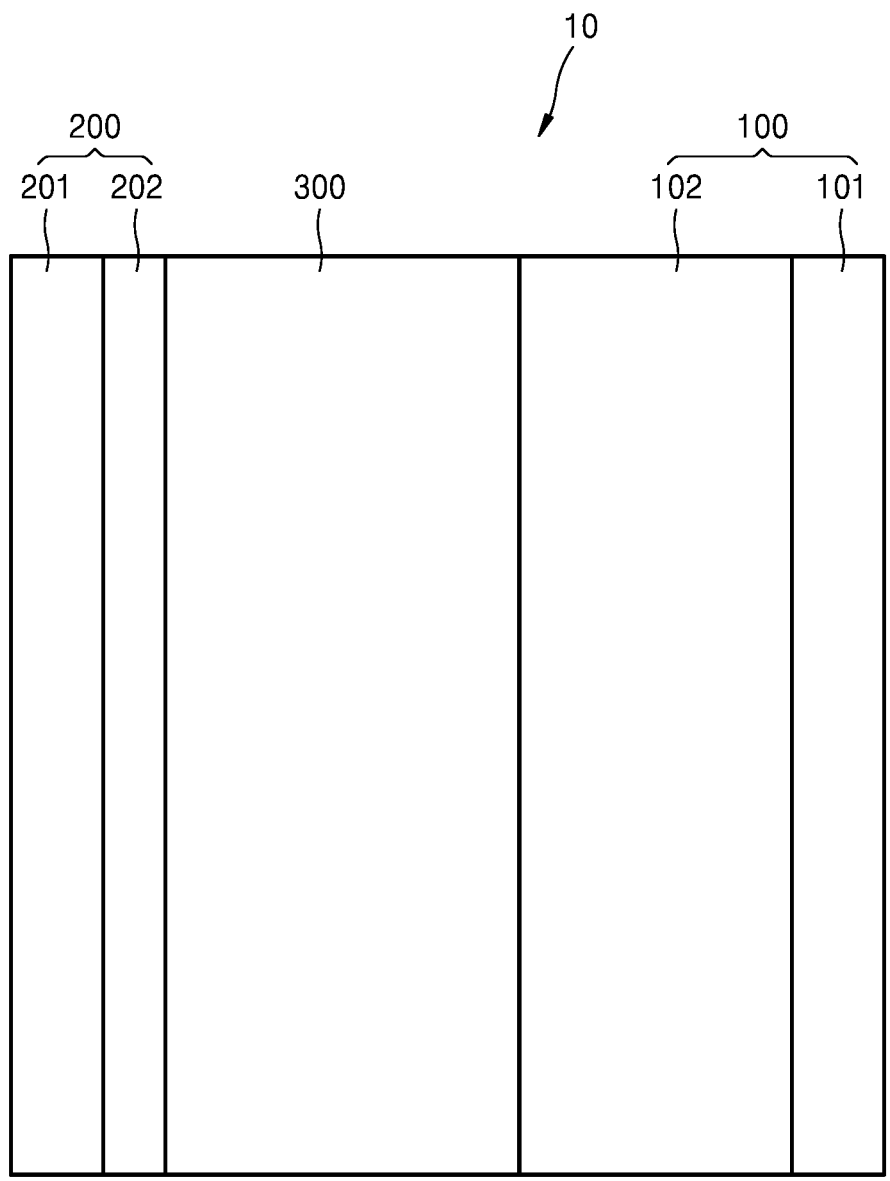
FIG. 1 is a cross-sectional view illustrating an embodiment of a schematic structure of an all-solid-state secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an all-solid-state secondary battery according to an embodiment will be described more fully with reference to the accompanying drawings. Widths and thicknesses of layers or regions shown in the accompanying drawings may be exaggerated for clarity and convenience of explanation. Throughout the detailed description, like reference numerals denote like elements.

Figure 2:
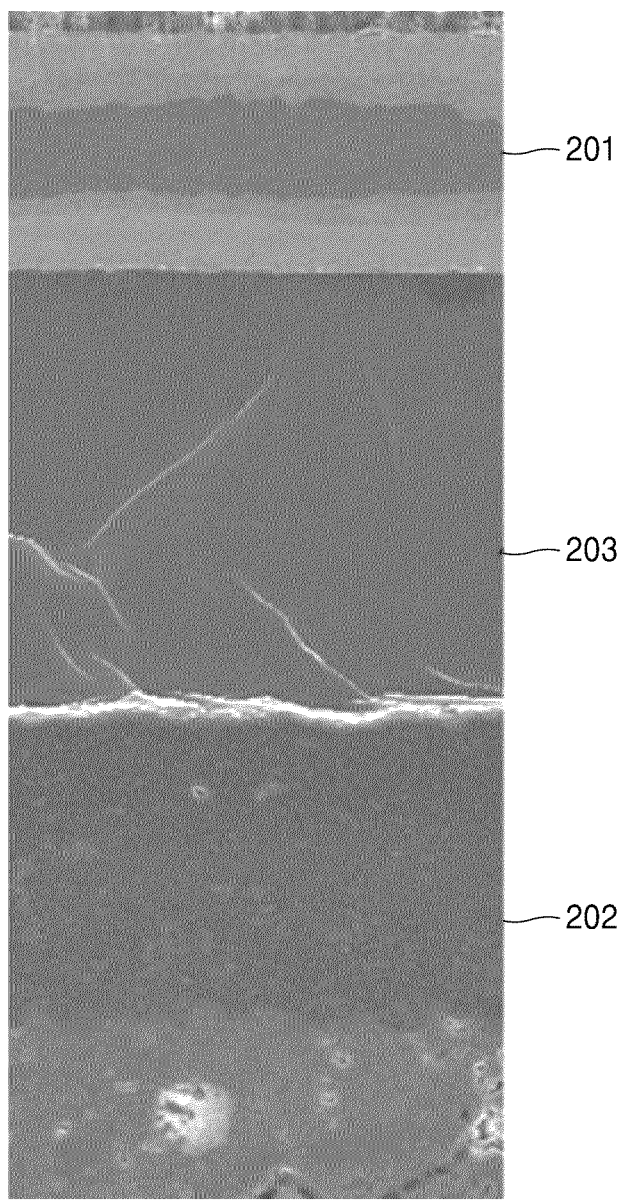
FIG. 2 is a scanning electron microscope (SEM) image of a cross-section of an all-solid-state secondary battery after overcharging an anode active material layer.
Figure 3:
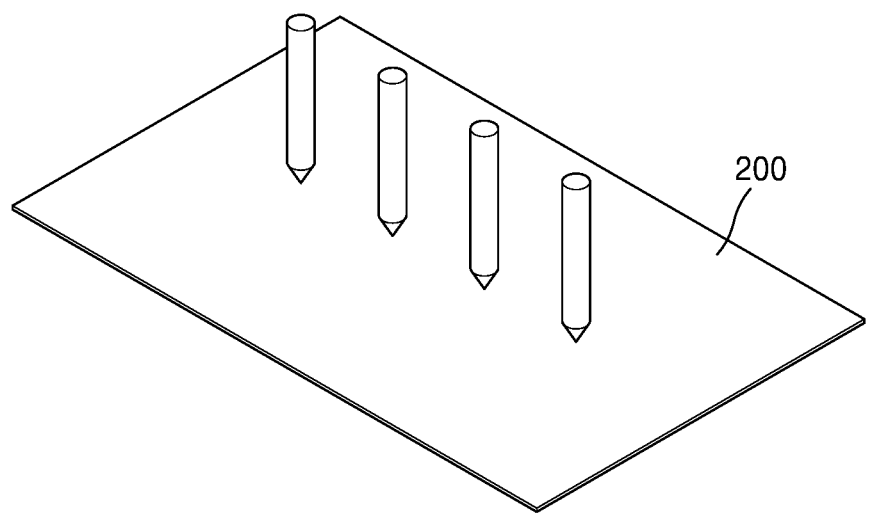
FIG. 3 is a schematic view illustrating an example of measuring sheet resistance of an anode layer.
Figure 4:
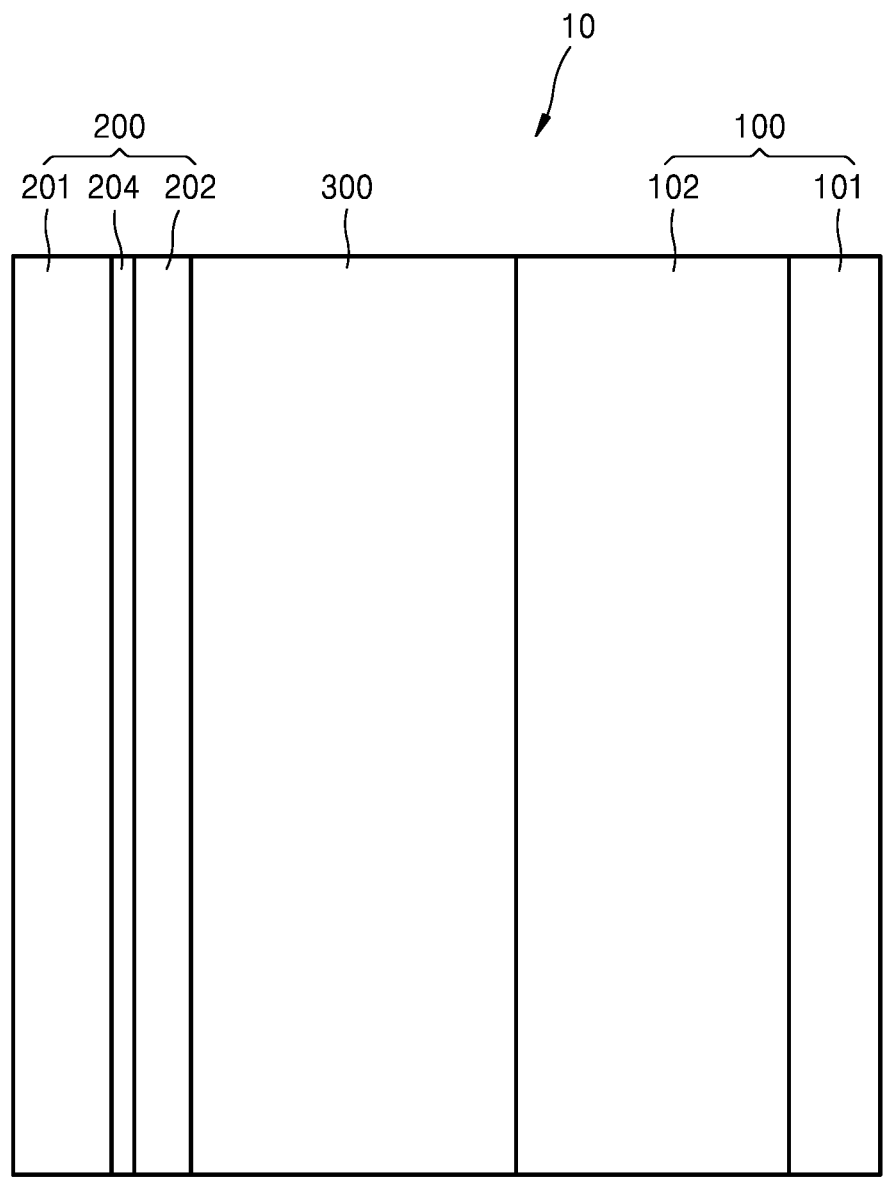
FIG. 4 is a cross-sectional view illustrating an embodiment of the all-solid-state secondary battery.

FIG. 1 is a cross-sectional view illustrating a schematic structure of an embodiment of an all-solid-state secondary battery according to an embodiment. FIG. 2 is a scanning electron microscope (SEM) image of a cross-section of an all-solid-state secondary battery after overcharging an anode active material layer. FIG. 3 is a schematic view illustrating an example of measuring sheet resistance of an anode layer. FIG. 4 is a cross-sectional view illustrating a modified example of the all-solid-state secondary battery according to an embodiment.

Referring to FIG. 1, the all-solid-state secondary battery 10 according to an embodiment may include a cathode layer 100, an anode layer 200, and a solid electrolyte layer 300. The cathode layer 100 according to an embodiment may include a cathode current collector 101 and a cathode active material layer 102.

The cathode current collector 101 may be provided in the form of a layer, e.g., a panel shape or a thin film shape. The cathode current collector 101 may comprise, for example, indium (In), magnesium (Mg), stainless steel, titanium (Ti), iron (Fe), cobalt (Co), nickel (Ni), zinc (Zn), aluminum (Al), germanium (Ge), or an alloy thereof. According to an embodiment, the cathode current collector 101 may be omitted as necessary.

The cathode active material layer 102 may include a cathode active material and a solid electrolyte material. The solid electrolyte material included in the cathode active material layer 102 may be substantially the same as a solid electrolyte material included in a solid electrolyte layer 300, which will later be described. The cathode active material layer 102 may include a sulfide solid electrolyte, an oxide solid electrolyte, or a combination thereof. For clarity, the solid electrolyte material is described in further detail with the solid electrolyte layer 300.

The cathode active material included in the cathode active material layer 102 is capable of reversibly intercalating and deintercalating lithium ions. For example, the cathode active material may comprise at least one of a lithium transition metal oxide, such as lithium cobalt oxide (hereinafter, referred to as "LCO"), lithium nickel oxide, lithium nickel cobalt oxide, lithium nickel cobalt aluminum oxide (hereinafter, referred to as "NCA"), lithium nickel cobalt manganese oxide (hereinafter, referred to as "NCM"), lithium manganate, or a lithium phosphate such as lithium iron phosphate, or nickel sulfide, copper sulfide, lithium sulfide, iron oxide, or vanadium oxide.

The cathode active material may comprise a lithium transition metal oxide having a layered rock-salt structure, among the above-described lithium salts. Here, the term "layered rock-salt structure" refers to a structure in which oxygen atomic layers and metal atomic layers are alternately arranged regularly in a <111> direction of a cubic halite structure, and as a result, each atomic layer forms a two-dimensional plane. In addition, the term "cubic halite structure" as used herein refers to a sodium chloride structure, which is a type of crystal structure. The lithium salt of a transition metal oxide having a layered halite structure, according to an embodiment, may include, for example, a lithium salt of a tertiary transition metal oxide such as $LiNi_xCo_yAl_zO_2$ (NCA) or $LiNi_xCo_yMn_zO_2$ (NCM), wherein $0<x<1$, $0<y<1$, and $0<z<1$, wherein $x+y+z=1$. When the cathode active material includes the lithium salt of the transition metal oxide having a layered halite structure, as described above, the energy density and thermal stability of the all-solid-state secondary battery 10 may be enhanced. In an aspect the lithium transition metal oxide having a layered rock salt-type structure may be, for example, $LiNi_xCo_yAl_vMn_wO_2$ $0<y\le0.2$, $0<v\le0.2$, $0<w\le0.2$, and $x+y+v+w=1$), $LiNi_xCo_yAl_vMn_wO_2$ $(0.8\le x\le0.95$, $0<y\le0.2$, $0<v\le0.2$, $0<w\le0.2$, and $x+y+v+w=1$), or $LiNi_xCo_yAl_vMn_wO_2$ $(0.85\times 0.95$, $0<y\le0.2$, $0<v\le0.2$, $0<w\le0.2$, and $x+y+v+w=1$).

In addition, the cathode active material according to an embodiment may be covered by a coating. The coating may comprise at least one of $Li_{1+x+y}Al_xTi_{2-x}Si_yP_{3-y}O_{12}$ wherein $0<x<2$ and $0\le y<3$, $BaTiO_3$, $Pb(Zr_aTi_{1-a})O_3$ wherein $0\le a\le1$, $Pb_{1-x}La_xZr_{1-y}Ti_yO_3$ wherein $0\le x<1$ and $0\le y<1$, $Pb(Mg_{1/3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ wherein $0<x<2$ and $0<y<3$, $Li_xAl_yTi_z(PO_4)_3$ wherein $0<x<2$, $0<y<1$, and $0<z<3$, $Li_{1+x+y}(Al_aGa_{1-a})_{2-x}(Ti_bGe_{1-b})_{2-x}Si_yP_{3-y}O_{12}$ wherein $0\le x\le1$, $0\le y\le1$, $0\le a\le1$, and $0\le b\le1$, $Li_xLa_yTiO_3$ wherein $0<x<2$ and $0<y<3$, $Li_2O$, $LiOH$, $Li_2CO_3$, $LiAlO_2$, $Li_2O$—$Al_2O_3$—$SiO_2$—$P_2O_5$—$TiO_2$—$GeO_2$, or $Li_{3+x}La_3M_2O_{12}$, wherein M is Te, Nb, or Zr, and $0\le x\le10$. In an embodiment, the coating according to this embodiment may comprise $Li_2O$—$ZrO_2$.

The present disclosure is not limited by the above-described embodiments, and the cathode active material layer 102 according to an embodiment may comprise in addition to the cathode active material and the solid electrolyte described above but also additive(s) such as a conductive agent, a binder, a filler, a dispersant, or an ion conducting coagent. The conductive agent according to an embodiment may include, for example, graphite, carbon black, acetylene black, ketjen black, carbon fiber, or a metal powder. In addition, the binder according to an embodiment may include, for example, styrene butadiene rubber (SBR), polytetrafluoroethylene, polyvinylidene fluoride, or polyethylene.

The anode layer 200 according to an embodiment may include an anode current collector 201 and an anode active material layer 202. The anode current collector 201 may include a material incapable of reacting with lithium, that is, a material that does not form an alloy or a compound when contacted with lithium metal. The anode current collector 201 may include, for example, one of copper (Cu), stainless steel, titanium (Ti), iron (Fe), cobalt (Co), or nickel (Ni), or an alloy of two or more thereof. The anode current collector 201 according to an embodiment may be provided in, for example, in the form of a panel or a thin film.

As shown in FIG. 4, a thin film 204 may be formed on a surface of the anode current collector 201. The thin film 204 may include an element alloyable with lithium. Examples of the element alloyable with lithium may include gold, silver, zinc, tin, indium, silicon, aluminum, or bismuth. The thin film 204 may include one of these metals or alloys of various types thereof. By inclusion of the thin film 204, the precipitated form of the metal layer 203, e.g., lithium metal deposited or plated on the current collector 201, may be further planarized and the all-solid-state secondary battery 10 may have further enhanced characteristics, such as enhanced cycle life.

Here, the thickness of the thin film 204 is not particularly limited but may be in a range of about 1 nanometers (nm) to about 500 nm, e.g., about 2 nm to about 400 nm, or about 8 nm to about 300 nm. When the thickness of the thin film 204 is less than 1 nm, functions of the thin film 204 may not be sufficiently demonstrated. When the thickness of the thin film 204 is greater than 500 nm, the thin film 204 itself may absorb lithium, and thus the amount of lithium precipitated at an anode may be reduced and the characteristics of the all-solid-state secondary battery 10 may deteriorate. The thin film 204 may be formed on the anode current collector 201 by, for example, vacuum evaporation, sputtering, or plating.

The anode active material layer 202 may include amorphous carbon and an anode active material capable of forming an alloy or a compound with lithium. The anode active material according to an embodiment may include, for example, at least one of gold (Au), platinum (Pt), palladium (Pd), silicon (Si), silver (Ag), aluminum (Al), bismuth (Bi), tin (Sn), titanium (Ti), or zinc (Zn). In addition, the amorphous carbon according to an embodiment may include, for example, at least one of carbon black (CB), acetylene black (AB), furnace black (FB), ketjen black (KB), or graphene. The anode active material may comprise graphite, carbon nanotubes, carbon fiber, mesoporous carbon, or mesocarbon microbeads. The amorphous carbon may have a Brunauer, Emmett and Teller (BET) surface area of 100 $m^2/g$ to about 5000 $m^2/g$, specifically 500 $m^2/g$ to about 2500 $m^2/g$. The amorphous carbon may have an average particle size of about 50 nanometers (nm) to about 500 nm, specifically 100 nm to about 400 nm.

In an embodiment, the anode active material layer 202 may include a mixture of at least one anode active material of gold, platinum, palladium, silicon, silver, aluminum, bismuth, tin, titanium, or zinc. In an embodiment, the anode active material layer 202 may include a first particle including amorphous carbon and second particles including an anode active material. Here, a mixing ratio (by mass) of the anode active material including the second particles to the amorphous carbon included in the first particles may be, for example, about 1:3 to about 1:1, about 1:2.5 to about 1:1.1, or about 1:2 to about 1:1.5. In addition, the anode active material may be included in an amount of about 1 weight percent (wt %) to about 50 wt %, based on a total weight of the anode active material layer 202.

As described above, since the anode active material layer 202 includes a mixture of the anode active material and the amorphous carbon mixed at an appropriate ratio, the sheet resistance of the anode layer 200 may be reduced. In an embodiment, when the anode active material layer 202 includes only the amorphous carbon, e.g., carbon black, a binding force between the anode active material layer 202 and the anode current collector 201 may be reduced and the anode layer 200 may have increased sheet resistance. In addition, when the anode active material layer 202 includes only the anode active material including a metal, e.g., silver (Ag), the amount of lithium (Li) inserted into silver (Ag) as the anode active material included in the anode active material layer 202 may be increased, thereby reducing a charge/discharge reaction speed. Therefore, when the mixture of the anode active material and the amorphous carbon is in an appropriate mixing ratio, as in the disclosed embodiment, the binding force between the anode active material layer 202 and the anode current collector 201 may be increased, and the sheet resistance of the anode layer 200 may be reduced. In addition, the charge/discharge reaction speed of the all-solid-state secondary battery 10 may be enhanced.

In an embodiment, when the anode active material layer 202 including the mixture of the anode active material and the amorphous carbon is disposed on the anode current collector 201 provided in a panel shape or a thin film shape, the sheet resistance of the anode layer 200 may be reduced to about 0.5 milliohms-centimeters (mΩ-cm) or less, e.g., about 0.5 mΩ-cm to about 0.001 mΩ-cm, or about 0.1 mΩ-cm to about 0.01 mΩ-cm. Here, the sheet resistance of the anode layer 200 may be measured using a 4-point probe shown in FIG. 3.

Here, when at least one material of gold, platinum, palladium, silicon, silver, aluminum, bismuth, tin, titanium, or zinc, are used as the anode active material, the anode active material may have a particle size (e.g., an average particle diameter) of about 4 micrometers (μm), about 0.001 μm to about 10 μm, or about 0.05 μm to about 5 μm. Here, the particle diameter of the anode active material may be a median diameter (D50) measured by, for example, a laser particle size distribution analyzer. According to an embodiment, a lower limit of the particle diameter is not particularly limited, but may be about 10 nm.

In addition, the anode active material layer 202 according to an embodiment may include a binder. In an embodiment, the binder may include at least one of styrene butadiene rubber (SBR), polytetrafluoroethylene, polyvinylidene fluoride, or polyethylene. The binder may include one of the above materials or may include a combination of two or more thereof.

By inclusion of the binder in the anode active material layer 202, the anode active material layer 202 may be stabilized on the anode current collector 201. For example, the anode active material layer 202 may be prepared by coating a slurry including constituent materials of the anode active material layer 202 dispersed therein on the anode current collector 201, followed by drying. By inclusion of the binder in the anode active material layer 202, the anode active material may be stabilized in the slurry. As a result, when the slurry is coated on the anode current collector 201 by, for example, screen printing, clogging of a screen (e.g., clogging due to an aggregate of the anode active material) may be suppressed.

In an embodiment, when the anode active material layer 202 includes the binder, an amount of the binder may range from about 0.3 wt % to about 15 wt %, or about 0.5 wt % to about 10 wt %, based on a total weight of the anode active material. When the amount of the binder is less than 0.3 wt %, the strength of the anode active material layer 202 may be insufficient, characteristics of the anode active material layer 202 may deteriorate, and it may be difficult to treat or handle the layer. When the amount of the binder is greater than 20 wt %, the characteristics of the all-solid-state secondary battery 10 may deteriorate. In an aspect, the amount of the binder may be about 3 wt %, based on a total weight of the anode active material. In addition, the anode active material layer 202 may further include an additive, including, for example, a filler, a dispersant, or an ion conductive agent. Selection of the additive, and the amount, may be determined by one of skill in the art without undue experimentation.

In addition, anode active material layer 202 may have a thickness of, for example, about 1 μm to about 20 μm, or about 2 μm to about 10 μm. When the thickness of the anode active material layer 202 is less than about 1 μm, the characteristics of the all-solid-state secondary battery 10 may not be sufficiently enhanced. When the thickness of the anode active material layer 202 is greater than about 20 μm, the anode active material layer 202 has a high resistance value, resulting in insufficient enhancement of the characteristics of the all-solid-state secondary battery 10.

The solid electrolyte layer 300 according to an embodiment may include a solid electrolyte material provided between the cathode active material layer 102 and the anode active material layer 202. The solid electrolyte material may include, for example, a sulfide-based solid electrolyte material. The sulfide-based solid electrolyte material may include, for example, $Li_2S$—$P_2S_5$, $Li_2S$—$P_2S_5$—LiX, where X is a halogen element, e.g., iodine (I) or chlorine (Cl), $Li_2S$—$P_2S_5$—$Li_2O$, $Li_2S$—$P_2S_5$-$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, where m and n are positive numbers, and Z is one of germanium (Ge), zinc (Zn), and gallium (Ga), $Li_2S$—$GeS_2$, $Li_2S$—$SiS_2$—$Li_3PO_4$, or $Li_2S$—$SiS_2$-$Li_pMO_q$, where p and q are positive numbers, and M is one of phosphorus (P), silicon (Si), germanium (Ge), boron (B), aluminum (Al), gallium (Ga), or indium (In). Here, the sulfide-based solid electrolyte material may be prepared by processing a starting material (e.g., $Li_2S$, $P_2S_5$, or the like) by a melting-quenching method, a mechanical milling method, or the like. In addition, after the processing, heat treatment may be performed on the sulfide-based solid electrolyte material. The solid electrolyte according to an embodiment may be amorphous, crystalline, or in a mixed form. In an embodiment, when the sulfide-based solid electrolyte material included in the solid electrolyte material includes $Li_2S$—$P_2S_5$, a mixing molar ratio of $Li_2S$ to $P_2S_5$ may be selected to be in a range of from, for example, about 50:50 to about 90:10.

The solid electrolyte material may include, for example, an oxide-based solid electrolyte. The oxide-based solid ion conductor may include a garnet ceramic ($Li_{3+x}La_3M_2O_{12}$, wherein M is Te, Nb, or Zr, and x is an integer of 1 to 10), lithium phosphorus oxynitride (LiPON, $Li_xPO_yN_z$, wherein $0<x<1$, $0<y<1$, and $0<z<1$), $Li_xP_yO_zN_k$ (wherein $2.7 \leq x \leq 3.3$, $0.8 \leq y \leq 1.2$, $3.5 \leq z \leq 3.9$, and $0.1 \leq k \leq 0.5$), $Li_wPO_xN_yS_z$ (wherein $0<w<1$, $0<x<1$, $0<y<1$, and $0<z<1$), $Li_{1+x+y}Al_xTi_{2-x}Si_yP_{3-y}O_{12}$ (wherein $0<x<2$, and $0 \leq y<3$), $BaTiO_3$, $Pb(Zr_aTi_{1-a})O_3$ (where $0 \leq a \leq 1$, PZT), $Pb_{1-x}La_xZr_{1-y}Ti_yO_3$ (PLZT) (wherein $x<1$, and $y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein $0<x<2$, and $0<y<3$), lithium aluminum titanium phosphate ($Li_xAl_yTi_z(PO_4)_3$, wherein $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (wherein $0 \leq x \leq 1$, $0 \leq y \leq 1$, $0 \leq a \leq 1$, and $0 \leq b \leq 1$), a lithium lanthanum titanate ($Li_xLa_yTiO_3$, wherein $0<x<2$, and $0<y<3$), a lithium germanium thiophosphate ($Li_xGe_yP_zS_w$, $0<x<4$, $0<y<1$, $0<z<1$, $0<w<5$), a lithium nitride-based glass ($Li_xN_y$, wherein $0<x<4$ and $0<y<2$), $SiS_2$ ($Li_xSi_yS_z$, wherein $0<x<3$, $0<y<2$, and $0<z<4$), a $P_2S_5$-based glass ($Li_xP_yS_z$, wherein $0<x<3$, $0<y<3$, and $0<z<7$), $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, or a combination thereof. For example, the oxide-based solid ion conductor may include a garnet ceramic having excellent reduction stability when in contact with a lithium negative electrode. The garnet ceramic may be, for example, $Li_{6.5}La_3Zr_{1.5}Ta_{0.5}O_{12}$ (LLZO).

In addition, the solid electrolyte layer 300 according to an embodiment may further include a binder. The binder included in the solid electrolyte layer 300 may include, for example, styrene butadiene rubber (SBR), polytetrafluoroethylene, polyvinylidene fluoride, and polyethylene. The binder of the solid electrolyte layer 300 may be identical to or different from the binders of the cathode active material layer 102 and the anode active material layer 202.

Also, as disclosed above, the

The all-solid-state secondary battery 10 according to an embodiment may be charged so as to exceed the charge capacity of the anode active material layer 202. That is, the anode active material layer 202 is overcharged. At the initial stage of charging, lithium is incorporated into the anode active material layer 202. When the all-solid-state secondary battery 10 is charged so as to exceed the charge capacity of the anode active material layer 202, as shown in FIG. 2, lithium is deposited on a rear surface of the anode active material layer 202, i.e., between the anode current collector 201 and the anode active material layer 202, and the metal layer 203 is formed by the deposited lithium. During discharge, lithium of the anode active material layer 202 and the metal layer 203 are ionized and transferred to the cathode layer 100. Thus, in the all-solid secondary battery 10, lithium may be used as an anode active material. In addition, since the anode active material layer 202 covers the metal layer 203, the anode active material layer 202 may act as a protective layer for the metal layer 203, and also inhibit the deposition and growth of dendrites. This may inhibit the short circuit and capacity reduction of the all-solid-state secondary battery 10, and furthermore, may enhance characteristics of the all-solid-state secondary battery 10. In addition, in an embodiment, since the metal layer 203 is not previously formed, manufacturing costs of the all-solid secondary battery 10 may be reduced. In this case, the anode current collector 201, the anode active material layer 202, and a region (interface) therebetween may be Li-free regions, e.g., not comprise lithium, at an initial state of or after discharging of the all-solid-state secondary battery 10.

Figure 5:
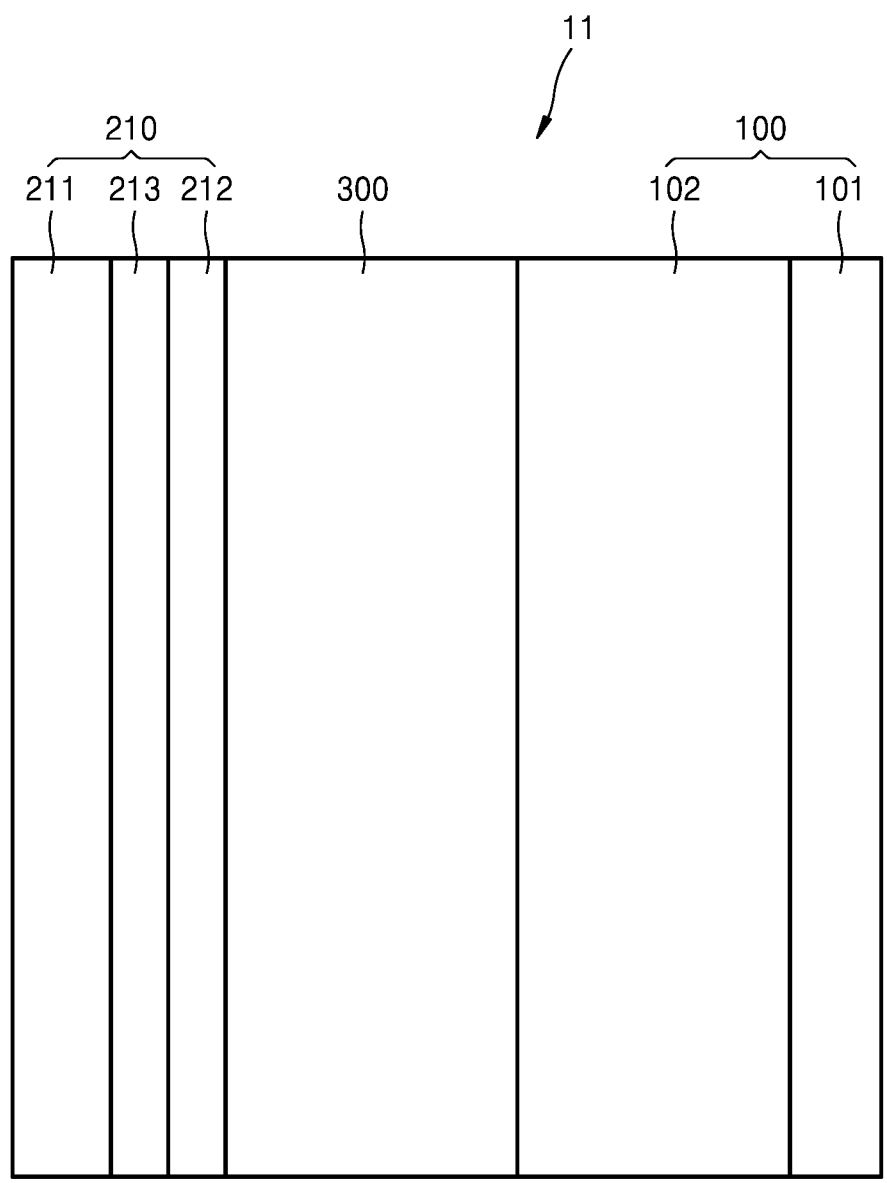
FIG. 5 is a cross-sectional view illustrating an embodiment of a schematic structure of an all-solid-state secondary battery.

FIG. 5 is a cross-sectional view illustrating a schematic structure of an all-solid-state secondary battery according to another embodiment.

Referring to FIG. 5, the all-solid-state secondary battery 11 according to another embodiment may include a cathode layer 100, an anode layer 210 and a solid electrolyte layer 300. Configurations of the cathode 100 and the solid electrolyte layer 300 are substantially the same as those shown in FIG. 1, and redundant descriptions thereof will be omitted for clarity.

In another embodiment, the anode layer 210 may include an anode current collector 211, an anode active material layer 212 and a metal layer 213. That is, in the embodiment shown in FIG. 1, the metal layer 203 is formed between the anode current collector 201 and the anode active material layer 202 by overcharging of the anode active material layer 202. However, in another embodiment, the metal layer 213 may be previously (i.e., prior to initial charging) formed between the anode current collector 211 and the anode active material layer 212.

Configurations of the anode current collector 211 and the anode active material layer 212 are the same as those of the anode current collector 201 and the anode active material layer 202 shown in FIG. 1. The metal layer 213 according to another embodiment may include lithium or a lithium alloy. That is, the metal layer 213 may function as a lithium reservoir. The lithium alloy may be, for example, a Li—Al alloy, a Li—Sn alloy, a Li—In alloy, a Li—Ag alloy, a Li—Au alloy, a Li—Zn alloy, a Li—Ge alloy, ora Li—Si alloy. The metal layer 213 may be comprise one of these alloys or lithium, or various types of alloys. In another embodiment, since the metal layer 213 acts as a lithium reservoir, the all-solid-state secondary battery 11 may have further enhanced characteristics.

Here, the thickness of the metal layer 213 is not particularly limited but may range, for example, from about 1 μm to about 200 μm, about 2 μm to about 150 μm, or about 4 μm to about 100 μm. When the thickness of the metal layer 213 is less than 1 μm, the function of the metal layer 213 as a reservoir may not be sufficiently exhibited. When the thickness of the metal layer 213 is greater than 200 μm, the mass and volume of the all-solid-state secondary battery 11 may be increased, resulting in rather deteriorated characteristics. The metal layer 213 may be, for example, metal foil having a thickness within the above-described range.

Figure 6A:
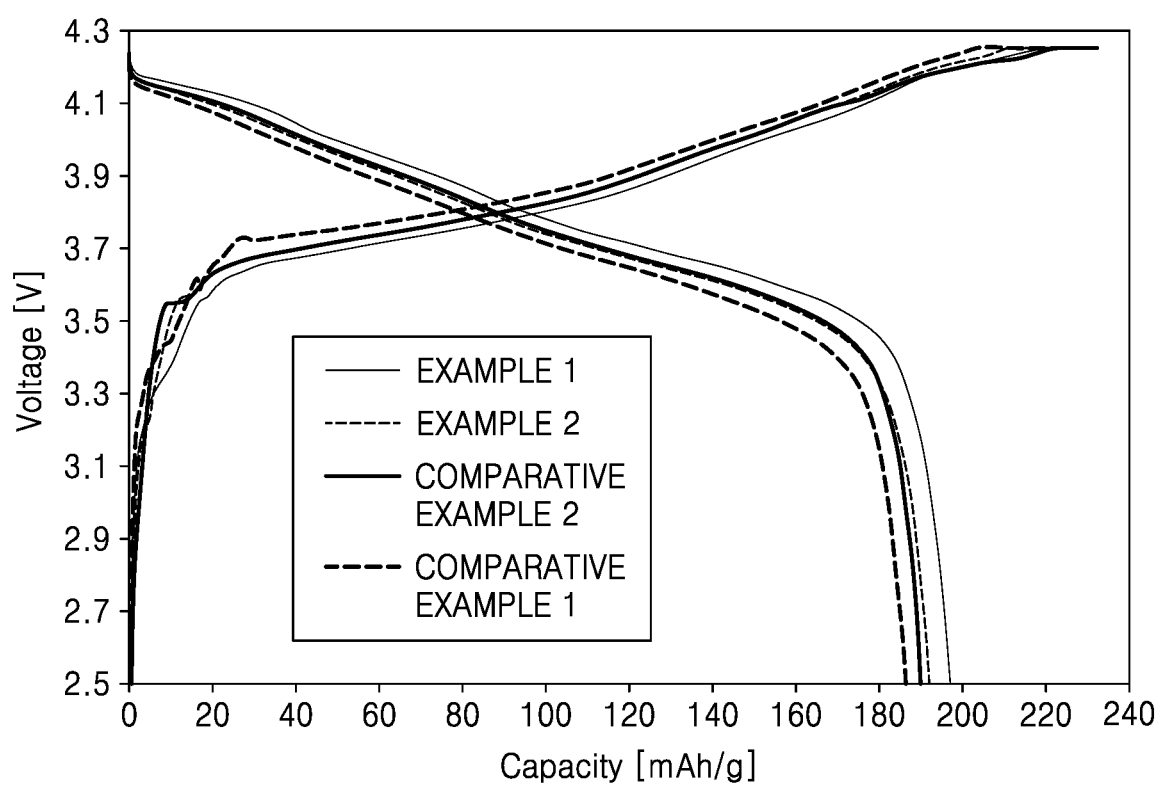
FIG. 6A is a graph of voltage (volts) versus capacity (milliampere hours per gram, mAh/g) showing charge and discharge characteristics at a first cycle of each of all-solid-state secondary batteries according to Examples 1 and 2 and Comparative Examples 1 and 2.
Figure 6B:
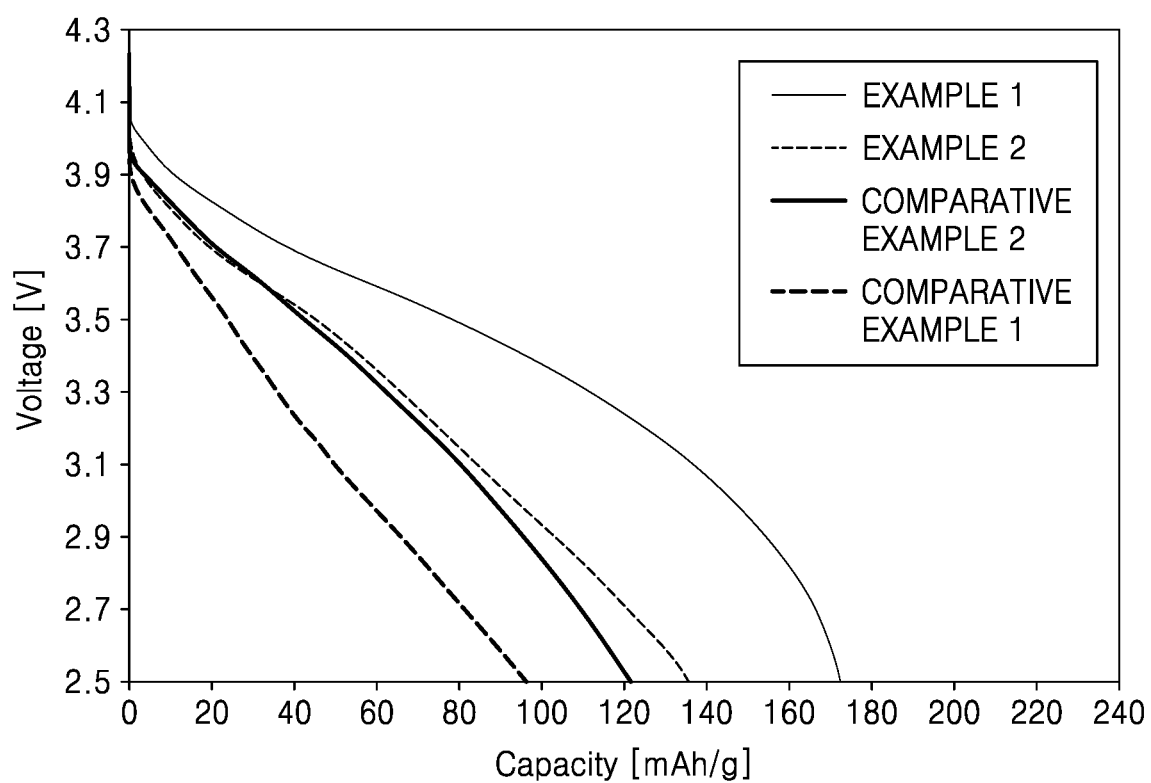
FIG. 6B is a graph of voltage (volts) versus capacity (milliampere hours per gram, mAh/g) showing discharge characteristics at a second cycle of each of all-solid-state secondary batteries according to Examples 1 and 2 and Comparative Examples 1 and 2.

FIG. 6A is a graph showing charge and discharge characteristics at a first cycle of each of all-solid-state secondary batteries according to Examples 1 and 2 and Comparative Examples 1 and 2. FIG. 6B is a graph showing discharge characteristics at a second cycle of each of all-solid-state secondary batteries according to Examples 1 and 2 and Comparative Examples 1 and 2.

Examples and Comparative Examples of the present disclosure will now be described.

EXAMPLES

Example 1

In Example 1, a cathode active material included in the cathode layer 100 is $LiNi_{0.9}Co_{0.07}Mn_{0.03}O_2$(NCM). In addition, a solid electrolyte is $LiCl$—$Li_2S$—$Li_3PS_4$, which has Argyrodite-type crystal structure. In addition, a binder may be polytetrafluoroethylene (Teflon binder available from DuPont). In addition, a conductive agent is carbon nanofiber (CNF). In Example 1, a cathode sheet is fabricated by mixing the cathode active material, the solid electrolyte, the conductive agent and the binder in a weight ratio of 83.8:14.8:0.2:1.2 and molding the resulting mixture into a sheet.

In addition, the cathode sheet is pressed on Al foil having a thickness of 18 μm as a cathode current collector to form a cathode layer.

The anode layer 200 for Example 1 is an anode current collector in the form of Ni foil having a thickness of 10 μm. In addition, the anode active material layer 202 is a mixture of silver (Ag) as an anode active material and carbon black as amorphous carbon. Here, a mixing ratio (by mass) of silver (Ag) as the anode active material to carbon black as the amorphous carbon is 1:3. Subsequently, 2 grams (g) of the mixture of carbon black and silver was put in a container, and an N-methyl-pyrrolidone (NMP) solution including 6.5 mass % of a polyvinylidene fluoride binder (KF-polymer #9300 manufactured by Kureha, Inc.) was added thereto. Then, the mixture was stirred to prepare a slurry. The slurry was coated onto Ni foil using a blade coater, and dried in air at 80° C. for 20 minutes. The obtained stacked structure was further dried under vacuum at 100° C. for 12 hours. An anode layer was formed by the above-described process.

The solid electrolyte layer 300 according to Example 1 includes $LiCl-Li_2S-Li_3PS_4$ as the solid electrolyte and an acryl-based binder. In Example 1, the solid electrolyte and the acryl-based binder are mixed in a weight ratio of 98.5:1.5. The resulting mixture was stirred while adding xylene and diethylbenzene thereto to prepare a slurry. The slurry was coated onto a non-woven fabric using a blade coater, and dried in air at 40° C. The resulting stacked structure was dried in a vacuum at 40° C. for 12 hours. The solid electrolyte layer was formed by the above-described process.

The cathode layer 100, the solid electrolyte layer 300 and the anode layer 200 are sequentially stacked in that order and encapsulated in a laminating film in a vacuum to manufacture the all-solid-state secondary battery 10. Here, a portion of each of the cathode current collector and the anode current collector was allowed to protrude outside of the laminating film so as not to break the vacuum of the battery. These protrusions are terminals for the cathode layer and the anode layer. In addition, the all-solid-state secondary battery 10 according to an embodiment was subjected to hydraulic pressure treatment at 500 megapascals (MPa) at 85° C. for 30 minutes.

Example 2

Example 2 is the same as Example 1, except that a mixing ratio (by mass) of silver (Ag) as an anode active material included in the anode active material layer 202 to carbon black as amorphous carbon was 1:1.

Comparative Example 1

Comparative Example 1 is the same as Example 1, except that only carbon black as amorphous carbon was included in the anode active material layer 202, i.e., a separate anode active material was omitted.

Comparative Example 2

Comparative Example 2 is the same as Example 1, except that a mixing ratio (by mass) of silver (Ag) as an anode active material included in the anode active material layer 202 to carbon black as the amorphous carbon was 25:1.

Comparative Example 3

Comparative Example 3 is the same as Example 1, except that a mixing ratio (by mass) silver (Ag) as an anode active material included in the anode active material layer 202 to graphite was 1:3.

Comparison of Charge and Discharge Characteristics

Charge and discharge characteristics of the all-solid-state secondary batteries manufactured in Examples 1 and 2 and Comparative Examples 1 to 3 were evaluated in the following charge and discharge tests. The charge and discharge tests were performed after each of the all-solid-state secondary batteries was placed in a thermostatic bath at 60° C. At the first cycle, the battery was charged at a constant current density of 0.62 $mA/cm^2$ until the voltage reached 4.25 V, and was charged at a constant voltage of 4.25 V until the current reached 0.31 $mA/cm^2$. Thereafter, the battery was discharged at a constant current density of 0.62 $mA/cm^2$ until the voltage reached 2.5 V. At the second cycle, the battery was charged at a constant current density of 0.62 $mA/cm^2$ until the battery voltage reached 4.25 V, and charged at a constant voltage of 4.25 V until the current reached 0.31 $mA/cm^2$. The discharging process was performed at a current density of 6.2 $mA/cm^2$ until the battery voltage reached 2.5 V.

TABLE 1

| | | Example 1 | Example 2 | Comparative Example 1 | Comparative Example 2 | Comparative Example 3 |
|---|---|---|---|---|---|---|
| Sheet resistance | mΩ cm | 0.23 | 0.21 | 4.09 | 0.58 | 6.39 |
| Charge capacity ($Q_1$) at first cycle at constant current density of 0.62 $mA/cm^2$ | mAh/g | 222.6 | 218.9 | 216.8 | 222.3 | 221.4 |
| Discharge capacity ($Q_2$) at first cycle at constant current density of 0.62 $mA/cm^2$ | mAh/g | 196.9 | 191.9 | 186.3 | 202.8 | 166.8 |
| $Q_2/Q_1$ | % | 88.5 | 87.7 | 85.9 | 91.2 | 75.3 |
| Resistance at constant voltage of 4.25 V | Ω | 10.0 | 12.5 | 15.0 | 10.4 | 11.9 |
| Discharge capacity ($Q_3$) at second cycle at constant current density of 6.2 $mA/cm^2$ | mAh/g | 172.6 | 136.0 | 96.7 | 142.6 | 10.5 |
| $Q_3/Q_1$ | % | 87.7 | 70.9 | 51.9 | 70.3 | 6.3 |

The evaluation results of the charge and discharge tests for the batteries manufactured in Examples 1 and 2 and Comparative Examples 1 to 3 are shown in Table 1 below and FIGS. 6A and 6B. Referring to Example 1 and Comparative Examples 1 and 3, it was confirmed the anode layer of the battery of Example 1 in which silver (Ag) as the anode active material and carbon black as the amorphous carbon were mixed, had a reduced sheet resistance, compared to that of the anode layer of the battery of Comparative Example 1 in which only carbon black as amorphous carbon was used or Comparative Example 3 in which silver (Ag) as the anode active material and graphite were mixed.

In addition, peel tests were performed on each of the batteries of Example 1 and Comparative Example 1 to evaluate peel strength between the anode active material layer and the anode current collector, and the results thereof are shown in Table 2.

TABLE 2

|  |  | Example 1 | Comparative Example 1 |
|---|---|---|---|
| Peel strength | mN/mm | 55.4 | 0.698 |

It was confirmed that the binding force between the anode active material layer and the anode current collector of the battery of Example 1 is more than 50 times higher than that between the anode active material layer and the anode current collector of the battery of Comparative Example 1.

Referring again to Table 1, in Examples 1 and 2 and Comparative Example 2, in which the mixing ratios of silver (Ag) as the anode active material to carbon black as the amorphous carbon are different from one another, it was confirmed that when the proportion of silver (Ag) as the anode active material included in the anode active material layer is increased, $Q_3/Q_1$ values, that is, the ratios of the discharge capacity ($Q_3$) at the second cycle at the constant current density of 6.2 mA/cm$^2$ to the charge capacity ($Q_1$) at the first cycle at the constant current density of 0.62 mA/cm$^2$, were reduced.

As described above, when only the amorphous carbon is included in the anode active material layer, the binding force between the anode active material layer and the anode current collector was reduced, and the discharge capacity was also reduced. Therefore, the anode active material layer should include a mixture of silver (Ag) as the anode active material and carbon black as the amorphous carbon. In this case, however, when the proportion of silver (Ag) as the anode active material is increased to a predetermined level, i.e., 50% or greater, the discharge capacity was reduced. Therefore, according to the present disclosure, an appropriate mixing ratio of the anode active material included in the anode active material layer to amorphous carbon may be determined, thereby providing an all-solid-state secondary battery capable of increasing the discharge capacity while reinforcing the peel strength.

In Examples 1 and 2, silver (Ag) was used as the anode active material included in the anode active material layer, but the anode active material may include at least one of gold (Au), platinum (Pt), palladium (Pd), silicon (Si), silver (Ag), aluminum (Al), bismuth (Bi), tin (Sn), titanium (Ti) and zinc (Zn), as described above.

In an embodiment, Example 3 is substantially the same as Example 1, except that a mixing ratio (by mass) of silicon (Si) as the anode active material included in the anode active material layer 202 to carbon black as the amorphous carbon is 1:3. Example 4 is substantially the same as Example 1, except that a mixing ratio (by mass) of zinc (Zn) as the anode active material included in the anode active material layer 202 to carbon black as the amorphous carbon is 1:3. Example 5 is substantially the same as Example 1, except that a mixing ratio (by mass) of titanium (Ti) as the anode active material included in the anode active material layer 202 to carbon black as the amorphous carbon is 1:3.

TABLE 3

|  |  | Example 3 | Example 4 | Example 5 |
|---|---|---|---|---|
| Sheet resistance | mΩ cm | 0.26 | 0.22 | 0.18 |
| Charge capacity ($Q_1$) at first cycle at constant current density of 0.62 mA/cm$^2$ | mAh/g | 222.5 | 225.1 | 220.2 |
| Discharge capacity ($Q_2$) at first cycle at constant current density of 0.62 mA/cm$^2$ | mAh/g | 199.1 | 203.8 | 186.4 |
| $Q_2/Q_1$ | % | 89.5 | 90.5 | 84.7 |
| Resistance at constant voltage of 4.25 V | Ω | 10.1 | 9.86 | 10.7 |
| Discharge capacity ($Q_3$) for second cycle at constant current density of 0.62 mA/cm$^2$ | mAh/g | 173.5 | 175.5 | 153.1 |
| $Q_3/Q_1$ | % | 87.1 | 86.1 | 82.1 |

Table 3 shows the results of the charge and discharge tests for the batteries of Examples 3 to 5 in which various materials other than silver (Ag) are used. Compared to Example 1 in which silver (Ag) as the anode active material and carbon black as the amorphous carbon were mixed in a ratio of 1:3, Examples 3 to 5 exhibited sheet resistance of the anode layer being 0.5 mΩ cm or less, and a $Q_3/Q_1$ ratio maintained to be 80% or higher, confirming that the discharge capacity ($Q_3$) was not reduced.

While various embodiments are set forth in the foregoing description; however, the embodiments should be construed as illustrative of specific examples, rather than as limiting the scope of the disclosure. For example, one of ordinary skill in the art may understand that the all-solid secondary battery and the charging method may vary with reference to the drawings. In specific embodiments, it will be appreciated that the spirit and the principle of the disclosure may be applied to a partial-solid secondary battery instead of the all-solid secondary battery, a secondary battery using a partial-liquid electrolyte, or a battery other than a lithium battery. Therefore, the scope of the disclosure is not to be determined by the Examples described above but by the spirit and scope as defined by the following claims.

In addition, according to the disclosed embodiments, an all-solid-state secondary battery including an anode active material layer including a mixture of an anode active material and amorphous carbon mixed in an appropriate weight ratio may be provided.

In addition, according to the disclosed embodiments, an all-solid-state secondary battery having a reinforced binding force between an anode active material layer and an anode current collector may be provided.

In addition, according to the disclosed embodiments, an all-solid-state secondary battery having an increased discharge capacity may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An all-solid-state secondary battery comprising:
a cathode layer comprising a cathode active material;
an anode layer comprising an anode current collector and an anode active material layer disposed on the anode current collector, the anode active material layer comprising an anode active material which is silver and amorphous carbon which is carbon black; and
a solid electrolyte layer disposed between the cathode active material layer and the anode active material layer,
wherein a weight ratio of the anode active material to the amorphous carbon is about 1:3, and
the anode layer has sheet resistance of about 0.5 milliohms-centimeters or less.

2. The all-solid-state secondary battery of claim 1, wherein the anode active material is contained in an amount of about 1 weight percent to 40 weight percent, based on a total weight of the anode active material layer.

3. The all-solid-state secondary battery of claim 1, wherein the anode active material layer further comprises a binder.

4. The all-solid-state secondary battery of claim 3, wherein the binder is contained in an amount of about 0.3 weight percent to about 15 weight percent, based on a total weight of the anode active material.

5. The all-solid-state secondary battery of claim 1, wherein the anode active material layer has a thickness in a range of about 1 micrometer to 20 micrometers.

6. The all-solid-state secondary battery of claim 1, further comprising a metal layer disposed between the anode current collector and the anode active material layer, wherein the metal layer comprises at least one of lithium or a lithium alloy.

7. The all-solid-state secondary battery of claim 6, wherein the metal layer is disposed between the anode current collector and the anode active material layer before the all-solid-state secondary battery is charged.

8. The all-solid-state secondary battery of claim 7, wherein the metal layer has a thickness in a range of about 1 micrometer to 200 micrometers.

9. The all-solid-state secondary battery of claim 6, wherein the metal layer is disposed between the anode current collector and the anode active material layer does not comprise lithium.

10. The all-solid-state secondary battery of claim 1, further comprising a film including an element alloyable with lithium on the anode current collector,
wherein the film is disposed between the anode current collector and the anode active material layer.

11. The all-solid-state secondary battery of claim 10, wherein the film has a thickness in a range of about 1 nanometer to about 500 nanometers.

12. The all-solid-state secondary battery of claim 1, wherein the anode current collector, the anode active material layer, and a region therebetween are lithium-free regions.

13. The all-solid-state secondary battery of claim 1, wherein the anode layer has sheet resistance of about 0.5 milliohm-centimeters to about 0.001 milliohm-centimeters.

14. The all-solid-state secondary battery of claim 1, wherein the amorphous carbon has a specific surface area of 100 square meters per gram to about 5000 square meters per gram.

15. A method of manufacturing an all solid-state secondary battery, the method comprising:
providing a cathode including a cathode active material;
providing an anode including an anode current collector and an anode active material layer disposed on the anode current collector, wherein the anode active material layer comprises an anode active material which is silver and amorphous carbon which is carbon black; and
disposing a solid electrolyte layer between the cathode active material layer and the anode active material layer,
wherein a weight ratio of the anode active material to the amorphous carbon is about 1:3, and
the anode layer has sheet resistance of about 0.5 mΩ cm or less, to manufacture the all-solid-state battery of claim 1.

* * * * *